(12) United States Patent
Wally et al.

(10) Patent No.: US 8,366,522 B2
(45) Date of Patent: Feb. 5, 2013

(54) SYSTEM AND METHOD FOR WEIGHING PRODUCTS

(75) Inventors: Jürgen Wally, Frankfurt (DE); Michael Theiß, Altstadt (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 13/103,025

(22) Filed: May 6, 2011

(65) Prior Publication Data

US 2011/0275296 A1    Nov. 10, 2011

(30) Foreign Application Priority Data

May 7, 2010   (EP) ..................................... 10004880

(51) Int. Cl.
*A22C 11/00*   (2006.01)
(52) U.S. Cl. ........................................ 452/32
(58) Field of Classification Search .............. 452/30–32, 452/35–37, 46–48, 51
See application file for complete search history.

(56) References Cited

U.S. PATENT DOCUMENTS

| | | | |
|---|---|---|---|
| 5,743,792 A * | 4/1998 | Hanten et al. .................... | 452/37 |
| 6,245,369 B1 | 6/2001 | Kobussen et al. | |
| 6,419,077 B1 * | 7/2002 | White et al. ............... | 198/468.6 |
| 7,255,638 B2 * | 8/2007 | Stimpfl ........................... | 452/32 |
| 7,614,942 B2 * | 11/2009 | Liermann et al. ............. | 452/186 |
| 7,775,861 B2 * | 8/2010 | Sames .............................. | 452/32 |
| 7,824,250 B2 * | 11/2010 | Topfer ............................ | 452/51 |
| 7,942,728 B2 * | 5/2011 | Sames .............................. | 452/51 |
| 2009/0080607 A1 | 3/2009 | Hoffmann et al. | |
| 2011/0045755 A1 | 2/2011 | Töpfer | |

FOREIGN PATENT DOCUMENTS

| | | |
|---|---|---|
| DE | 19519394 A1 | 11/1996 |
| DE | 10338217 B3 | 1/2005 |
| DE | 10 2005 044 877 A1 | 3/2007 |
| DE | 102005053348 A1 | 5/2007 |
| EP | 1897446 A2 | 3/2008 |

OTHER PUBLICATIONS

DE 10 2005 044 877 A1—English abstract and machine translation obtained from Espacenet (http://worldwide.espacenet.com) accessed on Apr. 20, 2012, 11 pages.

* cited by examiner

*Primary Examiner* — Richard Price, Jr.
(74) *Attorney, Agent, or Firm* — Hahn Loeser & Parks LLP; Bret A. Hrivnak, Esq.

(57) ABSTRACT

A system for producing sausage-shaped products that includes a filling machine for filling a tubular casing with viscous or granular stuff, a clipping machine for dividing the filled tubular casing into sausage-shaped products and closing the sausage-shaped products by closing means; and a transportation device for discharging the sausage-shaped products out of the clipping machine and transporting the sausage-shaped products along a transport path for storing them on rod-like elements, being positioned in an automatic hanging line for accommodating the rod-like elements; wherein the transport path extends from the clipping machine to the distal end of said smoking rod.

14 Claims, 4 Drawing Sheets

Fig. 3

SYSTEM AND METHOD FOR WEIGHING PRODUCTS

This application claims priority to, and the benefit of, European Patent Application No. 10 004 880.0-1260 filed May 7, 2010, which is hereby incorporated by reference.

BACKGROUND OF THE INVENTION

The present invention relates to a system for producing sausage-shaped products, in particular, sausages, according to the preamble of claim 1 as well as to a method for controlling the system according to the preamble of claim 8.

In particular, the present invention relates to a system for producing sausage-shaped products, in particular sausages, comprising a filling machine for filling a tubular casing with viscous or granular stuff, in particular sausage meat, a clipping machine for dividing the filled tubular casing into sausage-shaped products and closing the sausage-shaped products by closing means like clips, and a transportation device for discharging the sausage-shaped products out of the clipping machine and transporting the sausage-shaped products along a transport path for storing them on rod-like elements, in particular smoking rods, being positioned in an automatic hanging line for accommodating the rod-like elements, wherein the transport path extends from the clipping machine to the distal end of said smoking rod. The method comprises the steps of providing a tubular casing, filling said tubular casing with viscous or granular stuff, in particular sausage meat, dividing the filled tubular casing into sausage-shaped products and closing the sausage-shaped products by closing means, like clips, in a clipping machine, and discharging at least one sausage-shaped product out of the clipping machine by a transportation device and transporting the sausage-shaped products along a transport path for storing them on rod-like elements, in particular smoking rods, being positioned in an automatic hanging line for accommodating the rod-like elements, wherein the transport path extends from the clipping machine to the distal end of said smoking rod.

From patent application DE 10 2005 044 877, a device and a method for producing sausage-shaped products, for instance sausages, are already known, wherein a filling tube is provided for feeding a packing material or tubular casing, respectively, with, for example, sausage meat wherein the tubular casing is closed at one end facing in the filling direction by a first clip. After the filling operation is concluded, the tube-like casing is finally closed. If the sausage-shaped product is later to be hung up, for example for the purposes of smoking or storage in case of sausages, a suspension loop is fed thereto in such a way that, when the clip is fitted, it is embraced by the clip and is thus secured to the sausage-shaped product. The term "loops" in accordance with this invention is used to denote all at least partially flexible means, by way of which articles can be hung up.

Furthermore, to produce sausage-shaped products of equal length, in the German patent 195 19 394, a method and a device for producing sausage-shaped products, like sausages, is disclosed, wherein the tube-like casing material is provided with marks, like pictures or labels in predetermined regular intervals according to the length of the sausage-shaped product to be produced. Said marks are detected by a respective sensor, which controls the clipping machine. Sausage-shaped products are fed out of the clipping machine by a first transportation device, like a belt-conveyor. An additional conveyor, arranged subsequently to the first band-conveyor, includes a weighing cell for sensing the weight of the sausage-shaped product. The sensor of the weighing cell is coupled to the casing breaking device. In the case that the weight of the sausage-shaped product falls under a predetermined value, breaking force of the casing breaking device will be increased, whereby more filling material, like sausage meat, is filled into the casing material. Since the length of the sausage-shaped product remains equal, its weight increases. In case that the weight of a sausage-shaped product is higher than a predetermined value, the breaking force of the casing breaking device is lowered and the weight of the subsequent sausage product will decrease.

In the production of sausage-shaped products, sausage producing machines as described above may be part of a system, wherein an automatic hanging line is directly attached to the sausage producing machine. Sausage-shaped products fed out of the clipping machine are automatically caught by their suspension loop and hung up on rod-like elements, like smoking rods. Said systems are of high productivity, which is normally reached by a high production rate. Accordingly, a conveyor including a weighing device has to be operated at a high speed, which may lead to an imprecise weighing result. On the other hand, the conveyor including the weighing device is an additional device in the sausage production system. The conveyor needs to be of a maximum length according to the length of the largest sausage product, which may be produced at the sausage producing machine. Otherwise, the length of the sausages which can be produced is limited by the length of the conveyor.

BRIEF SUMMARY OF THE INVENTION

Therefore, it is an object of the invention to provide a system for producing sausage-shaped products and a method for controlling the system, with which the above mentioned drawbacks can be overcome and with which sausage-shaped products of predetermined dimensions may be produced with high productivity.

The aforesaid object with respect to the system is achieved by the features of claim 1, whereas the aforesaid object with respect to the method is achieved by the features of claim 8. Advantageous configurations of the invention regarding the system are described in claims 2 to 7, and with regard the method in claims 9 to 14.

In the present invention, the system for producing sausage-shaped products, in particular sausages, comprises a filling machine for filling a tubular casing with viscous or granular stuff, in particular sausage meat, a clipping machine for dividing the filled tubular casing into sausage-shaped products and closing the sausage-shaped products by closing means like clips, and a transportation device for discharging the sausage-shaped products out of the clipping machine and transporting the sausage-shaped products along a transport path for storing them on rod-like elements, in particular smoking rods, being positioned in an automatic hanging line for accommodating the rod-like elements, wherein the transport path extends from the clipping machine to the distal end of said smoking rod, wherein a weighing device for sensing the weight of at least one of the sausage-shaped products is provided, wherein the weighing device is positioned along the transport path of sausage-shaped products for receiving a sausage-shaped product to be weighed and wherein the weighing device is adapted to transfer the weighed sausage-shaped product to the rod-like element being positioned in the automatic hanging line.

Thereby, the transport path of the sausage-shaped products is defined by the moving path of the sausage-shaped products at the end of the clipping machine through the automatic hanging line. According to the invention, sausage-shaped products are automatically transferred to the weighing device during the transport path wherein all, some or only one sausage-shaped product per smoking rod to be loaded with a specific number of sausage-shaped products can be fed to the weighing device. In principle, it is also possible that the sausage-shaped product to be weighed is chosen accidentally from the produced sausage-shaped products. After measuring the weight of the sausage-shaped products, these are automatically moved to the smoking rod positioned in the automatic hanging line. This configuration allows a reliable sensing of the weight of the sausage-shaped product by a high production rate and a rapid adaption of the weight of the sausage-shaped products to a predetermined value.

Preferably, the weighing device is positioned at the end of the transport path. In particular, the first sausage-shaped product of a number of sausage-shaped products being provided to be hung to the same rod-like element or smoking-rod, respectively, is weighed.

According to the preferred embodiment, a drive is provided for linearly or reciprocally movement of the weighing device between a weighing position in which at least one sausage-shaped product is positioned on the weighing device, and a retracted or non-operating position, respectively, in which no sausage-shaped product is positioned on the weighing device. Especially, the sausage-shaped product is positioned on the weighing device after being fed out of the clipping machine. In particular, a tubular casing for a sausage-shaped product is closed at one end. Afterwards, the tubular casing is filled with viscous or granular stuff and the second end is closed by a clip. Together with the first or second clip a loop is secured to the first or second end of the sausage-shaped product. The produced sausage-shaped product is then fed out of the clipping machine by a suitable conveyor. The loop of the sausage-shaped product is engaged by a hook of the conveyor and transported by said conveyor until it reaches its place on the rod-like element at which the hook of the conveyor releases the loop and thus the sausage-shaped product. In view of the invention, the sausage-shaped product can also be transported until is reaches the weighing device and is placed thereon. Especially, at least the first sausage-shaped product of a number of sausage-shaped products being provided to be hung to the same rod-like element or smoking rod, respectively, is positioned on the weighing device, the weighing device being positioned between the rod-like element and the conveyor. After the sausage-shaped product has been weighed, the weighing device is moved in a retracted position. Thereby, the weighed sausage-shaped product falls off the weighing device onto the rod-like element. If the weighed sausage-shaped product is the first sausage shaped-product of a number of sausage-shaped products being provided to be hung to the same rod-like element or smoking rod, respectively, it will be placed on the distal end of the rod-like element, i.e. the end of the rod-like element which is the furthest away from the clipping machine.

Preferably, a piston-cylinder-assembly is provided which allows the linear movement of the weighing device between the weighing position and the retracted position. However, the choice of the weighing device for the reciprocate movement can be any other type, like an electric motor.

According to an embodiment, the weighing device comprises a stud-like projection which can be arranged such that it faces the clipping machine and on which the at least one sausage-shaped product is positioned. Due to the stud-like form of the projection, the sausage-shaped product or the loop of it, respectively, can be easily moved onto and from the projection with low friction.

According to the preferred embodiment, the stud-like projection comprises a tapered end facilitating the transfer of the sausage-shaped product on the weighing device.

A deflector can be provided urging the at least one weighed sausage-shaped product from the weighing device after the weighing process. Thereby, the deflector can be moved reciprocally along the stud-like projection by a drive. In such a case, the deflector has a non-operating position distal from the tip of the stud-like projection and is moved in the direction of the tip to remove the loop and thus the sausage-shaped product from the stud-like projection. Alternatively or additionally, the deflector can be arranged in a stationary position and the loop together with the sausage-shaped product is removed from the stud-like projection by the retreat movement of the weighing device which can be moved reciprocally.

Furthermore, the invention relates to a method for controlling a system for producing sausage-shaped product, in particular sausages, with the steps of providing a tubular casing, filling said tubular casing with viscous or granular stuff, in particular sausage meat, dividing the filled tubular casing into sausage-shaped products and closing the sausage-shaped products by closing means, like clips, in a clipping machine, and discharging at least one sausage-shaped product out of the clipping machine by a transportation device and transporting the sausage-shaped products along a transport path for storing them on rod-like elements, in particular smoking rods, being positioned in an automatic hanging line for accommodating the rod-like elements, wherein the transport path extends from the clipping machine to the distal end of said smoking rod, and sensing the weight of at least one of the sausage-shaped products using a weighing device which is positioned along the transport path of sausage-shaped products for receiving a sausage-shaped product to be weighed and transferring the weighed sausage-shaped product to the rod-like element being positioned in the automatic hanging line. With respect to the advantages it is referred to above statements.

In particular, the weighing device is linearly or reciprocally moved between a weighing position in which at least one sausage-shaped product is positioned on the weighing device and a retracted or non-operating position in which no sausage-shaped product is positioned on the weighing device. Especially, the weighing device is movable along the whole length of the smoking rod.

According to an embodiment, the at least one sausage-shaped product is urged from the weighing device onto the rod-like element when the weighing device is moved from the weighing position into the retracted position. No additional part is necessary to urge the sausage-shaped product from the weighing device. The movement of the weighing device is sufficient.

Alternatively, the at least one weighed sausage-shaped product is urged from the weighing device onto the rod-like element by a deflector. The deflector is a separate part being attached to the production unit. The stud-like deflector can be stationary fixed onto or movably attached to the production unit. Furthermore, the deflector is adjustable in dependency of the size of the sausage-shaped products.

Preferably, the weight of the at least one sausage-shaped product is sensed by a sensing element being part of the weighing device. In dependence of the sensed weight of the sausage-shaped product, the filling of the following sausage-shaped products can be adapted, that means the filling quantity will be increased or decreased.

The sum of weights of all sausage-shaped products stored on the rod-like element can be calculated on the basis of the weight of the sensed weight of the at least one sausage-shaped product.

According to the preferred embodiment, a tendency for the development of the weight of the sausage-shaped products is derived on the basis of the weight of a single sausage-shaped product. Based on said tendency, the control unit can act on e.g. the clipping machine for vary the size of the sausage-shaped product, even if its weight is still inside a predefined range of weight. Thereby, losses due to oversized or undersized sausage-shaped products may be reduced.

Further advantages and a preferred embodiment will be described in the following together with the drawings listed below. The expressions "left", "right", "below" and "above" are referred to the drawings in an alignment such that the reference numbers used can be read in normal.

DETAILED DESCRIPTION OF THE INVENTION

Figure 1:
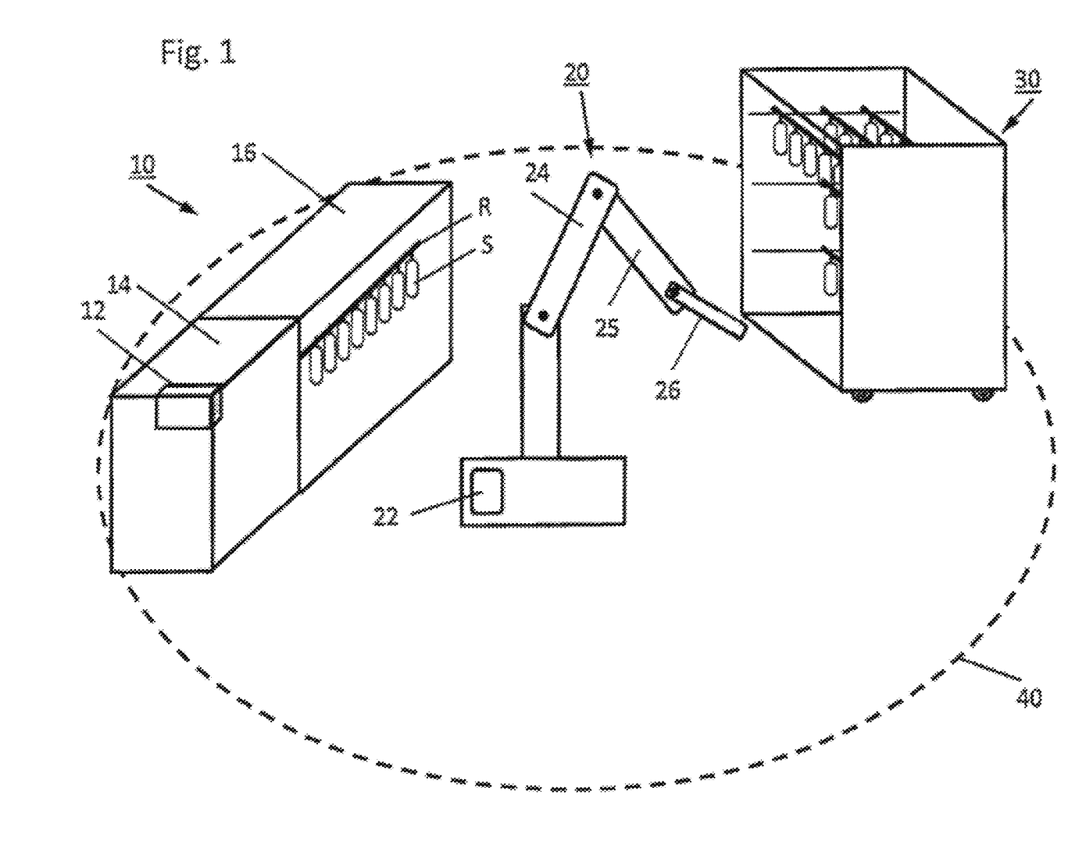
FIG. 1: is a schematically view of a system for producing and handling sausage-shaped products according to the present invention.

According to FIG. 1, the system for producing and handling sausage-shaped products S, e.g. sausages S, comprises as main components a schematically shown production unit 10 for producing sausages S and storing them on rod-like elements R, e.g. smoking rods, a robotic device 20 having a control unit 22 for controlling the movement of robotic device 20 and a storage frame 30, into which the sausages S hung up at the smoking rods R are to be moved.

Production unit 10 comprises a control unit 12, a sausage production device 14 and an automatic hanging line 16. At least automatic hanging line 16 is peripherally arranged inside an operation range 40 of robotic device 20 described below. In production unit 10, sausages S are produced in a known manner by filling sausage meat through a filling pipe into a tubular casing and closing the casing by a clipping machine attaching and closing clips at both ends. A flexible suspension loop is fed to one of the closing clips to be attached together with said clip to the respective end of the sausages S. Thereafter sausages S will be placed in regular intervals at smoking rod R in automatic hanging line 16.

Robotic device 20 is positioned in the centre of its operation range 40 to reach all units and stations peripherally arranged inside operation range 40 by its pivotally attached arms 24, 25. At front end of arm 25, a gripping unit 26 is arranged for gripping the rod-like element R with the sausage products S hanging thereon inside production unit 10, in particular from automatic hanging line 16, and moving it to movable storage frame 30.

Storage frame 30 is positioned in operation range 40 of robotic device 20. Inside storage frame 30 tray rails, e.g. in the form of horizontally aligned bars, are arranged for positioning smoking rods R thereon.

Figure 2:
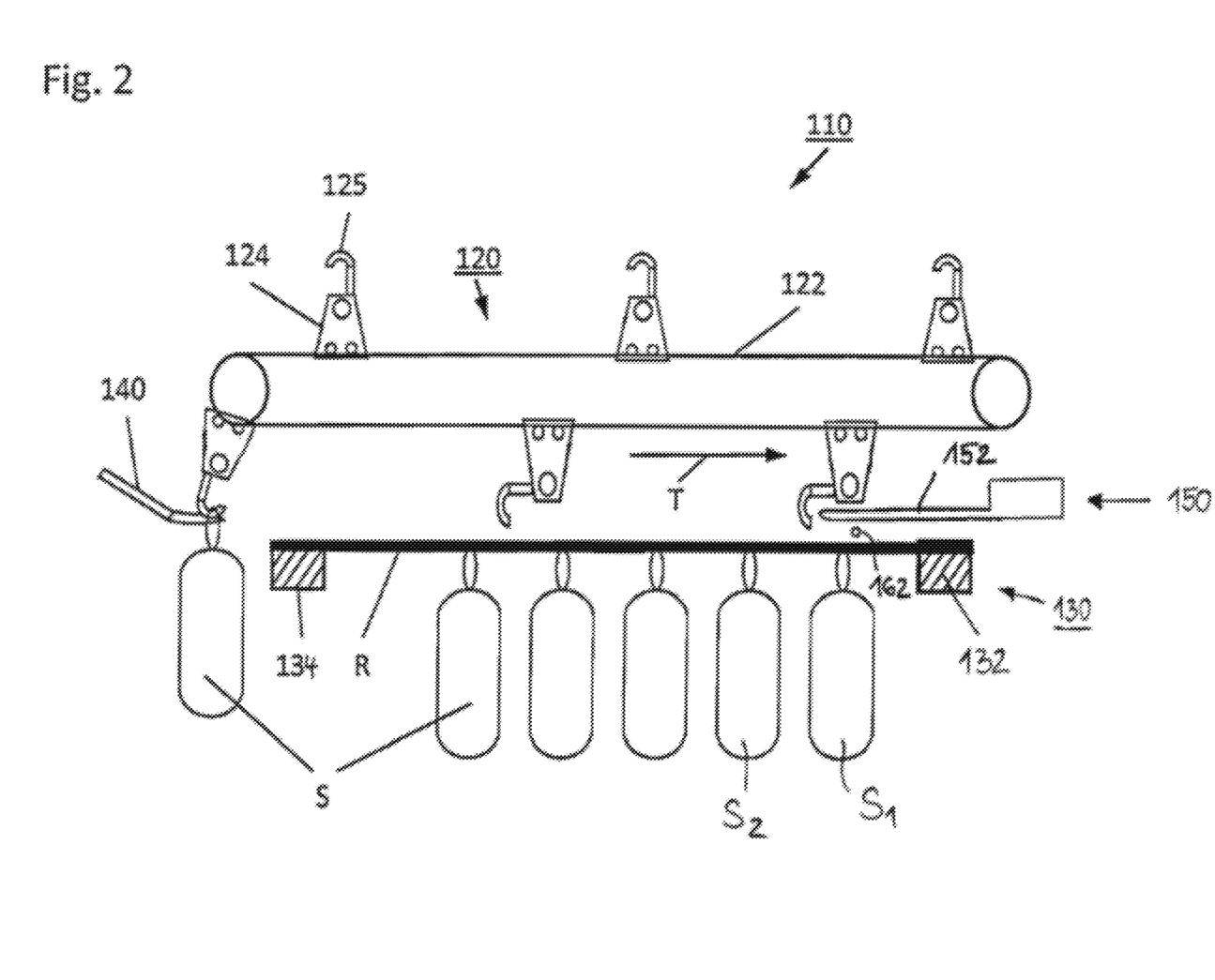
FIG. 2: is a schematically view of an automatic hanging line in the system according to FIG. 1 including a weighing device with a sensing element according to the present invention.

In FIG. 2, an automatic hanging line 110 is schematically and partially shown. Amongst others, said automatic hanging line 110 comprises a transportation device in the form of a horizontally arranged conveyor 120 and a clamping device 130 for clamping a smoking rod R on which sausages S are to be hung up. Sausages S are transported from sausage production device 14 to automatic hanging line 16.

Conveyor 120 includes a conveyor belt or chain 122 which circulates in a vertical plane and on which hook elements 124 are arranged in regular intervals. Conveyor chain 122 circulates about two turning points in a direction identified by arrow T. Hooks 125 of hook elements 124 at the carrying side of chain 122 are in a delivering position, where hooks 125 are pivoted into an approximately horizontal position parallel to chain 122. Hooks 125 of hook elements 124 at the return side of chain 122 are in a receiving position, where hooks 125 are perpendicularly aligned to chain 122.

Below conveyor chain 122, a smoking rod R is arranged parallel to conveyor chain 122 and in a distance which corresponds almost to the vertical height of a hook element 124. Smoking rod R is held by a holding device 130 at its right end. Holding device 130 comprises an only schematically shown clamping unit 132, which may be known in the art. At the left end of smoking rod R, a further bearing 134 for smoking rod R is shown so that smoking rod R is borne on both ends. It is principle possible to hold smoking rod R only on one end, for example, the right end by a respective clamping unit.

In the region of the left end of smoking rod R, a delivery unit 140 can be arranged. Delivery unit 140 is part of the mechanism for feeding an actually produced sausage S out of the clipping machine, which is not shown and which may also be known in the art. Delivery unit 140 is arranged to be passed by a hook element 124, whereby a sausage S positioned in delivery unit 140 is caught by hook element 124. The delivery unit can also be formed by a conveyor belt or a guiding means for the loops of sausages S.

Between conveyor chain 122 and smoking rod 130, a weighing device 150 is arranged at the end of transport path, in particular in the region of the right end of smoking rod R which is the distal end of smoking rod R referred to the clipping machine. Weighing device 150 is attached to production unit 10 by fasteners 151 (see FIGS. 3 and 4) and is positioned in such a way between conveyor chain 122 and smoking rod R that at least one sausage S can be transferred by hooks 125 to weighing device 150. In particular, a loop of sausage S may abut on a stud-like projection 152 of weighing device 150, stud-like projection 152 being arranged substantially parallel to smoking rod R and conveyor chain 122.

Figure 3:
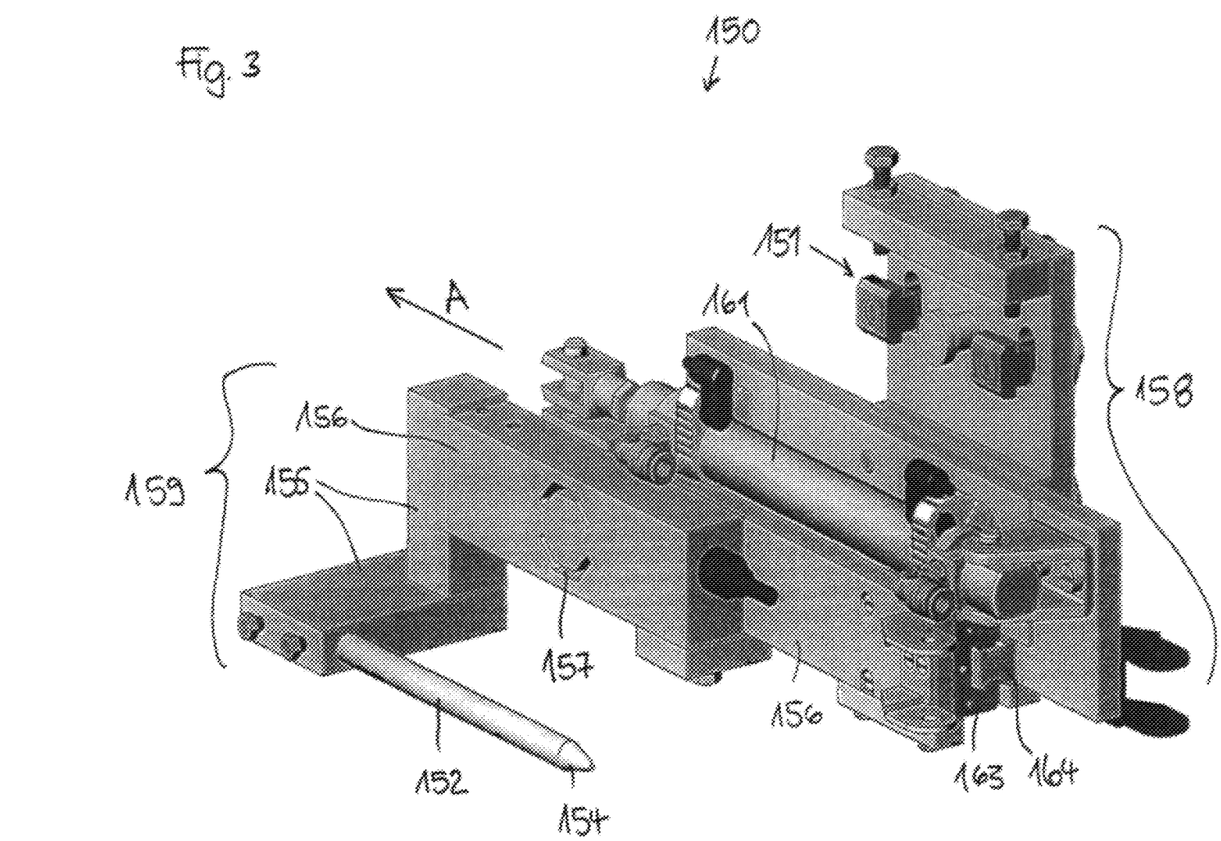
FIG. 3: is a perspective view of the weighing device in its weighing or operating position being part of the system for producing sausage-shaped products according to the present invention shown in FIG. 1.
Figure 4:
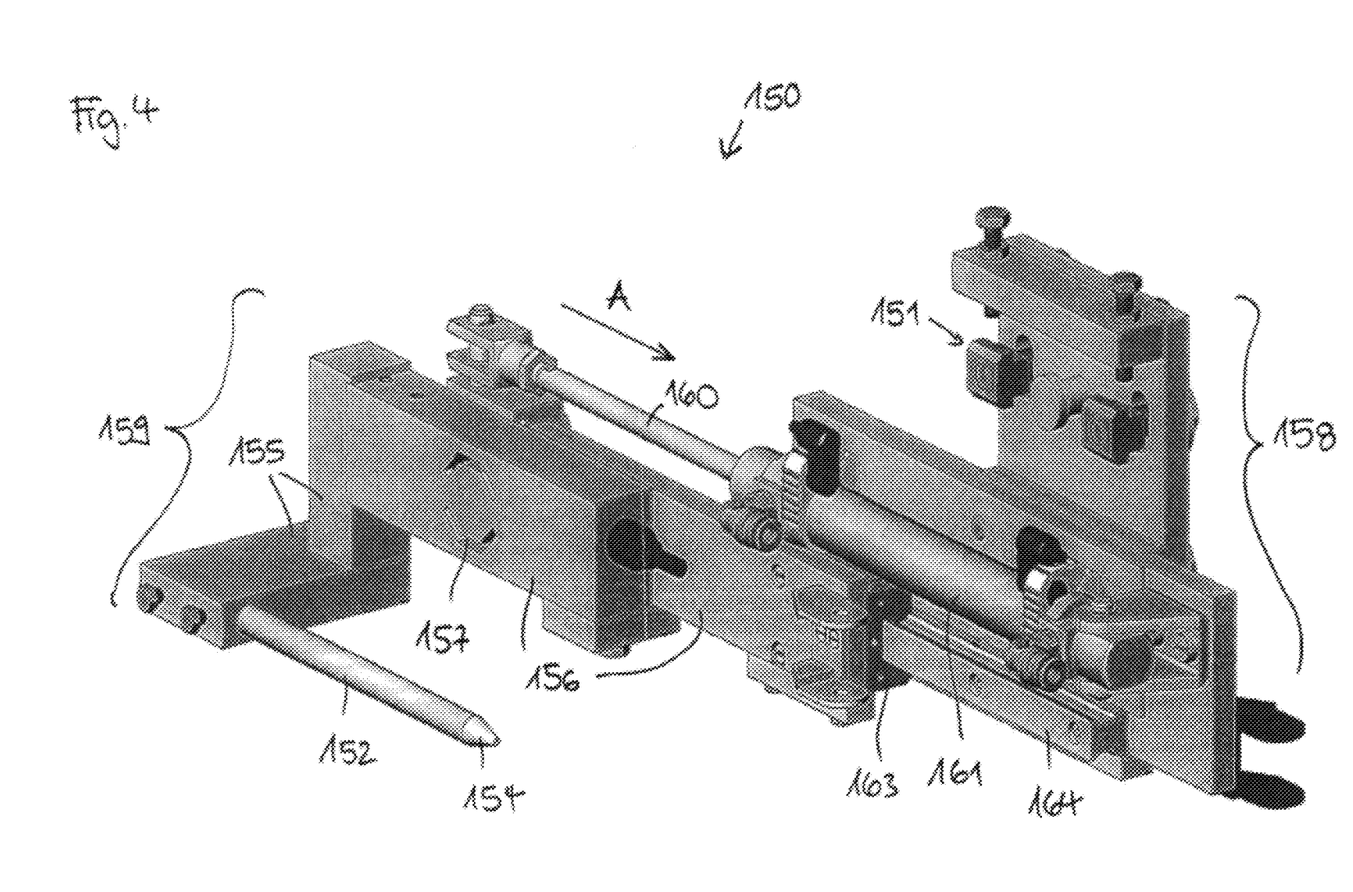
FIG. 4: is a perspective view of the weighing device in its retracted position being part of the system for producing sausage-shaped products shown in FIG. 1.

As can be seen in detail in FIGS. 3 and 4, stud-like projection 152 comprises a circular cross-section and a tapered end 154 facing the clipping machine. Projection 152 is attached through an essentially L-shaped beam 155 with a two-part beam 156 being substantially parallel to projection 152, beam 156 accommodating a sensing element 157. Sensing element 157 is only schematically shown, but corresponds to sensing elements being already known from prior art. The part of weighing device 150 consisting of projection 152, L-shaped beam 155 and beam 156 is linearly or reciprocally movable in a direction identified by arrow A relative to a fastened part 158 of weighing device 150. In the following, the part consisting of projection 152, L-shaped beam 155 and beam 156 is also called movable part 159 of weighing device 150. Movable part 159, especially the beam 156, comprises a substantially C-shaped element 163, C-shaped element 163 interacting with a corresponding rail 163 of fastened part 158 of weighing element 150.

A piston 160 is attached to movable part 159, in particular to beam 156, interacting with a cylinder 161 being connected with fastened part 158 of weighing device 150. The piston-cylinder-assembly allows a limited movement of a part of weighing device 150, the direction being substantially parallel to a smoking rod R positioned on the holding device 130. Weighing device 150 can take a weighing position in which at least one sausage S is positioned on projection 152 (see FIG. 3) and a retracted position in which no sausage S is positioned on projection 152 (see FIG. 4). In particular, a sausage S is transferred from a hook 125 to projection 152 as it is explained in detail below.

In the following, the method for controlling a system is described.

Sausage production device 14 comprises a filling pipe on which a tubular casing for the sausage S is stored. The tubular casing is closed at its front end at the opening of the filling pipe by a closing clip constituting the first end of the sausage S. Filling material like sausage meat is filled into the casing via the filling pipe. If a predetermined length of the filled sausage S is reached, the clipping machine gathers the filled casing, whereby a plait free from sausage meat is provided, and stacks at least one clip at the plait for closing the second end of the sausage S. Together with the clip, a flexible hanging means, like a loop, is secured to the second end of the sausage product S for hanging up the sausage product S thereon. At the same time, a second clip may be stack and closed around to the plait, constituting the first end of the subsequent sausage S.

Alternatively to the length of the sausage S, the size of the sausage meat portion filled into the casing may be predetermined or the duration of the filling process.

Upon closing the tubular casing and securing a loop to the second end of the sausage S, the sausage meat free plait is cut between the second clip of the sausage S and the first clip of the first end of the subsequent sausage S. The actually produced sausage is than fed out of the clipping machine by a suitable conveyor like a belt conveyor. The loop is thereby caught by a guide for placing the sausage S at delivery unit 140.

Conveyor 120 turns in the direction T, whereby a hook element 124 passes delivery unit 140. Hook 125 of hook element 124 engages the loop of sausage S and transfers sausage S to smoking rod R or to weighing device 150. At a predetermined position, hook 125 is pivoted from the receiving position into the delivering position (the receiving position of a hook element 124 is shown with the left lower hook element 124, whereas the delivery position of a hook element 124 is shown with the middle lower and right hook elements 124). Thereby, the sausage S is placed on smoking rod R or on weighing device 150. After passing the second turning point, which is the right one in FIG. 2, hook element 124 enters the return side, whereby hook 125 is pivoted into the receiving position. In particular, at least the first sausage S which is placed from the left side onto smoking rod R is placed on projection 152 of weighing device 150 when weighing device 150 is in its weighing position (see FIGS. 2 and 3). The sausage S placed on projection 152 causes a force. Said force is detected by sensing element 157. Based on the position of sausage S on projection 152, that means based on the distance between sausage S and L-shaped beam 155, the weight of sausage S is calculated according to the lever principle in a respective calculation device in control unit 12 of sausage production unit 10.

The lever principle allows calculating the weight of a sausage S from its known distance to the sensing element 155, which, in this case, is the "lever", and the force acting on sensing element 155 via the moment caused by the weight of the sausage S and the length of the "lever".

According to the result of said calculation, the size of the actually produced sausage S or the subsequent sausage S may be altered. If the calculated weight exceeds a predetermined value, the length of the following sausages S may be reduced. Alternatively, the duration of the filling process may be reduced or a smaller amount of sausage meat is filled into the casing.

The calculation device of control unit 12 calculates the weight of the sausage S actually hung up on projection 152 of weighing device 150 and, in the case that the weight of the sausage S exceeds or falls under a predetermined threshold value, control unit 12 acts on the clipping machine and/or the pump of the filling machine and/or other suitable devices, like the casing breaking device, for altering the weight of the sausage S still to be produced.

After measurement of sausage S, movable part 159 of weighing device 150 is linearly moved in its retracted position (see FIG. 4) by a drive (not shown). Thereby, sausage S is urged from projection 152 and rests onto smoking rod R. Since weighing device 150 and smoking rod R are close to each other, sausage S is not damaged when it is urged from projection 152 onto smoking rod R. For urging sausage S from projection 152, a deflector 162 (schematically shown in FIG. 2) can be provided. Stud-like deflector 162 is positioned between projection 152 of weighing device 150 and smoking rod R. When projection 152 of weighing device is moved from weighing position into retracted position, loop of weighed sausage S is held by deflector 162 and is not moved together with weighing device, but is urged from projection 152. In placing sausage S onto projection 152 of weighing device, the position of deflector 162 defines the position of sausage S on projection 152, as deflector 162 stops the movement of sausage S. That means the lever for calculating the weight of sausage S is always the same. Deflector 162 can stationary fixed onto or movably attached to automatic hanging line 16. Then, deflector 162 is for example pivotable.

Alternatively, not only the first sausage S1 but also a second sausage S2 can be positioned onto projection 152 and the weights of both sausages S are measured.

After a certain number of sausages S has been placed on smoking rod R, a respective signal is sent from control unit 12 of sausage production device 10 to control unit 22 of robotic device 20. Robotic device 20 controlled by control unit 22, is moved towards automatic hanging line 16 and grips a smoking rod R. For gripping a smoking rod R, at the front end of arm 25 of robot device 20, a gripping unit 26 is arranged. Gripping unit 26 may comprise at least one jaw for gripping a smoking rod R. In a simplified embodiment, gripping unit 26 may only provided with hook-like elements, in which a smoking rod R rests.

Robotic device 20, which may be a so called joined-arm robot, removes a smoking rod R together with the sausage products S hanging thereon from automatic hanging line 16 and moves it towards storage frame 30. Smoking rods R will be placed at predetermined positions on the tray rails inside storage frame 30 according to the size of the sausage products S.

For security reason, it is possible to derive safety signals from sensing element 157, e.g. in the case that the weight of a sausage S exceeds a maximum value or falls under a minimum value. In that case, a weighing error has been occurred and the sausage production may be stopped by control unit 12.

To rise up the productivity and to reduce costs, the present system for producing sausage-shaped products S may be simplified by merging control units 12 and 22 into a common control unit. Said single control unit allows an easier and effective data input and a connection between control units 12 and 22, e.g. by wire, will be redundant.

The invention claimed is:

1. A system for producing sausage-shaped products, comprising:
   a filling machine for filling a tubular casing with viscous or granular stuff, in particular sausage meat;
   a clipping machine for dividing the filled tubular casing into sausage-shaped products and closing the sausage-shaped products by closing means;
   a transportation device for discharging the sausage-shaped products out of the clipping machine and transporting the sausage-shaped products along a transport path for storing them on rod-like elements, in particular smoking rods, being positioned in an automatic hanging line for accommodating the rod-like elements, wherein the transport path extends from the clipping machine to the distal end of said smoking rod, and
   a weighing device for sensing the weight of at least one of the sausage-shaped products, wherein the weighing device is positioned along the transport path of sausage-shaped products for receiving a sausage-shaped product to be weighed and wherein the weighing device is adapted to transfer the weighed sausage-shaped product to the rod-like element being positioned in the automatic hanging line.

2. The system according to claim 1,
   wherein the weighing device is positioned at the end of the transport path of sausage-shaped products.

3. The system according to claim 1 further comprising:
   a drive for linearly movement of the weighing device between a weighing position in which at least one sausage-shaped product is positioned on the weighing device, and a retracted position in which no sausage-shaped product is positioned on the weighing device.

4. The system according to claim 3 further comprising:
   a piston-cylinder-assembly which allows the linear movement of the weighing device between the weighing position and the retracted position.

5. The system according to claim 1, wherein the weighing device comprises a stud-like projection on which the at least one sausage-shaped product is positioned for the weighing process.

6. The system according to claim 5,
   wherein the stud-like projection comprises a tapered end facilitating the transfer of the sausage-shaped product on the weighing device.

7. The system according to claim 1 further comprising:
   a deflector urging the at least one weighed sausage-shaped product from the weighing device after the weighing process.

8. A method for controlling a system for producing sausage-shaped product, with the steps of:
   providing a tubular casing;
   filling said tubular casing with viscous or granular stuff, in particular sausage meat;
   dividing the filled tubular casing into sausage-shaped products and closing the sausage-shaped products by closing means in a clipping machine;
   discharging at least one sausage-shaped product out of the clipping machine by a transportation device and transporting the sausage-shaped products along a transport path for storing them on rod-like elements, in particular smoking rods, being positioned in an automatic hanging line for accommodating the rod-like elements, wherein the transport path extends from the clipping machine to the distal end of said smoking rod, and
   sensing the weight of at least one of the sausage-shaped products using a weighing device which is positioned along the transport path of sausage-shaped products for receiving a sausage-shaped product to be weighed and transferring the weighed sausage-shaped product to the rod-like element being positioned in the automatic hanging line.

9. The method according to claim 8,
   wherein the weighing device is linearly moved between a weighing position in which at least one sausage-shaped product is positioned on the weighing device and a retracted position in which no sausage-shaped product is positioned on the weighing device.

10. The method according to claim 8,
    wherein the at least one sausage-shaped product is urged from the weighing device onto the rod-like element when the weighing device is moved from the weighing position into the retracted position.

11. The method according to claim 8,
    wherein the at least one weighed sausage-shaped product is urged from the weighing device onto the rod-like element by a deflector.

12. The method according to claim 8,
    wherein the weight of the at least one sausage-shaped product is sensed by a sensing element being part of the weighing device.

13. The method according to claim 8,
    wherein the sum of weights of all sausage-shaped products stored on the rod-like element is calculated on the basis of the weight of the sensed weight of the at least one sausage-shaped product.

14. The method according to claim 8,
    wherein a tendency for the development of the weight of the sausage-shaped products is derived on the basis of the weight of a single sausage-shaped product.

* * * * *

UNITED STATES PATENT AND TRADEMARK OFFICE
CERTIFICATE OF CORRECTION

PATENT NO. : 8,366,522 B2
APPLICATION NO. : 13/103025
DATED : February 5, 2013
INVENTOR(S) : Jurgen Wally et al.

It is certified that error appears in the above-identified patent and that said Letters Patent is hereby corrected as shown below:

IN THE CLAIMS:

In Column 10, lines 16-17 (claim 8) delete "in particular smoking rods,"

Signed and Sealed this
Sixth Day of August, 2013

Teresa Stanek Rea
*Acting Director of the United States Patent and Trademark Office*